(12) United States Patent
Walker et al.

(10) Patent No.: US 6,794,778 B1
(45) Date of Patent: Sep. 21, 2004

(54) BRAKING SYSTEM FOR POWERED WINDOW COVERING

(75) Inventors: Winston G. Walker, Littleton, CO (US); Dave Schmeling, San Diego, CA (US); Rich Scharf, Escondido, CA (US)

(73) Assignee: Harmonic Design, Inc., Los Angeles, CA (US)

( * ) Notice: Subject to any disclaimer, the term of this patent is extended or adjusted under 35 U.S.C. 154(b) by 0 days.

(21) Appl. No.: 10/445,149

(22) Filed: May 23, 2003

(51) Int. Cl.$^7$ ............................. H02K 49/10; E06B 9/32
(52) U.S. Cl. ............... 310/77; 160/168.1 P; 310/93; 310/152; 188/267
(58) Field of Search ............... 310/77, 93, 152, 310/154.1, 156.1, 92; 160/168.1 P, DIG. 16–17; 464/29; 192/84.3; 335/306; 188/267

(56) References Cited

U.S. PATENT DOCUMENTS

| | | | | |
|---|---|---|---|---|
| 2,341,440 A | * | 2/1944 | Hammer | 160/298 |
| 3,104,700 A | * | 9/1963 | Polsky | 160/298 |
| 3,352,349 A | | 11/1967 | Hennequin | 160/171 |
| 3,732,447 A | * | 5/1973 | Perhats | 310/76 |
| 4,103,191 A | * | 7/1978 | Kawamura et al. | 310/49 R |
| 4,522,244 A | | 6/1985 | Brolin | 160/170 |
| 4,623,012 A | | 11/1986 | Rude et al. | 160/243 |
| 5,038,087 A | * | 8/1991 | Archer et al. | 318/469 |
| 5,087,845 A | * | 2/1992 | Behrens et al. | 310/77 |
| 5,184,660 A | | 2/1993 | Jelic | 160/171 |
| 5,228,491 A | | 7/1993 | Rude et al. | 160/171 |
| 5,444,339 A | * | 8/1995 | Domel et al. | 318/17 |
| 5,542,506 A | * | 8/1996 | McMichael et al. | 188/267 |
| 5,543,672 A | * | 8/1996 | Nishitani et al. | 310/77 |
| 5,714,820 A | * | 2/1998 | Mitsuhashi et al. | 310/105 |
| 5,848,634 A | | 12/1998 | Will et al. | 160/310 |
| 6,714,733 B2 | * | 3/2004 | Kobayashi | 396/133 |

FOREIGN PATENT DOCUMENTS

| | | | |
|---|---|---|---|
| DE | 29509638 U1 | 11/1996 | ........... E05F/15/10 |
| EP | 0381643 A1 | 8/1990 | ............ E06B/9/82 |
| JP | 29028 | 2/1983 | ........................ 1/66 |
| JP | 109484 | 6/1985 | ........................ 9/32 |
| JP | 192987 | 8/1989 | ........................ 9/32 |
| JP | 363495 | 12/1992 | ...................... 9/264 |

\* cited by examiner

*Primary Examiner*—Burton Mullins
(74) *Attorney, Agent, or Firm*—John L. Rogitz

(57) ABSTRACT

Small permanent magnets are affixed to the protruding portion of a rotor of a motor that is coupled to gears in a gear enclosure. The rod of a window covering is coupled to the gears such that when the motor is energized by a user command signal, the window covering moves. Small braking magnets are also affixed to the receptacle of the gear enclosure, such that when the motor is deenergized, the magnetic coupling between the magnets of the rotor and those of the gear enclosure brakes the rod from turning under the weight of the window covering.

26 Claims, 2 Drawing Sheets

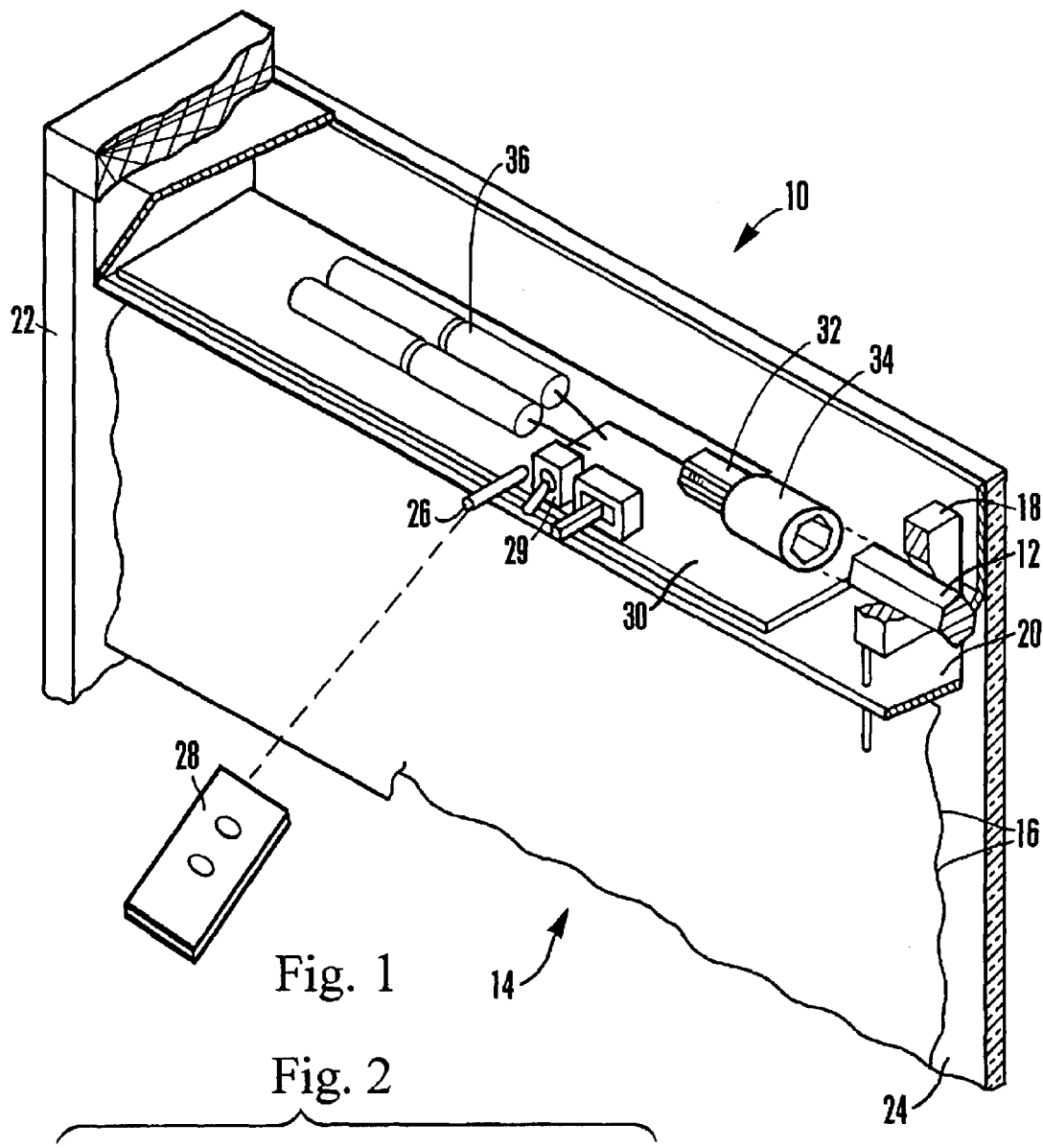
Fig. 1
Fig. 2
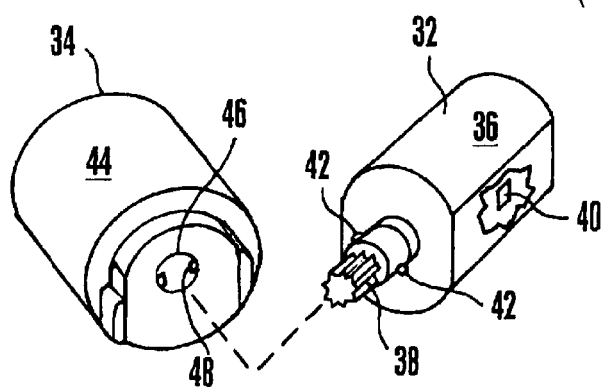
Fig. 3

BRAKING SYSTEM FOR POWERED WINDOW COVERING

FIELD OF THE INVENTION

The present invention relates generally to motorized window coverings, awnings, security screens, projection screens, and the like, which are being moved against a force that is resisting the repositioning, such as gravity, a counterbalance or a preload spring.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering.

As recognized herein, when no power is applied to the motor, a force (such as gravity) acting on the object being repositioned, particularly in the case of large objects, can be sufficient to overcome the inertia, stiction, and frictional drag of the power train components and cause the object to move without user command. Past efforts to eliminate such undesired movement include using solenoids that can be energized to hold the object at the last position commanded by the user or to operate a ratchet pawl that holds the object being repositioned. Unfortunately, such solenoids not only significantly add to the cost of the window covering, but also consume electrical power, a critical shortcoming in the case of battery-powered systems, and objectionable in systems powered by a public utility, since they either must be powered any time the window covering is not actually in operation, consuming considerable energy, or they must be powered during operation of the window covering significantly increasing the power required during operation. Inefficient gearing can prevent repositioning, but at the cost of additional power required to operate. The present invention understands that the above principles apply not only to raisable and lowerable window coverings such as shades, but also to projector screens and other objects that can be repositioned by a motor by raising or lowering the objects by, e.g., rolling and unrolling the objects.

SUMMARY OF THE INVENTION

A powered assembly includes an object that can be moved between a raised configuration and a lowered configuration. The assembly also includes a motor, an actuator coupled to the motor and the object to move the object when the motor is energized, with the motor and actuator defining a rotating member. A permanent magnet is affixed to one of: the rotating member, and a stationary element juxtaposed with the rotating member, while at least one of: a permanent magnet, and a magnetic element that is not a permanent magnet, is juxtaposed with the permanent magnet.

In preferred non-limiting embodiments, the motor may be powered by at least one dc battery and the object may be a window covering. The rotating member may be at least a portion of a rotor of the motor.

At least one permanent magnet may be attached to the rotating member, and a magnetic element that is not a permanent magnet may be stationarily juxtaposed with the rotating member. Or, a permanent magnet may be stationarily juxtaposed with the rotating member. The magnet or magnetic element that is stationarily juxtaposed with the rotating member may define a racetrack shape, or a circular shape, or a square shape, and it may include both permanent magnet and magnetic portions.

In another aspect, a drive assembly for a movable object including a rod includes an electrically-powered drive structure couplable to the rod to move the object when the drive structure is energized to move at least one rotatable component of the drive structure. A first braking magnet is attached to one of: a rotating component of the drive structure, and a stationary component of the drive structure. Also, at least one of: a second braking magnet, and a magnetic element that is not a permanent magnet, is attached to the other of: the stationary component, and the rotatable component such that the weight of the window covering is substantially impeded from moving the rod when the drive structure is de-energized.

In another aspect, a power assembly for an object having at least one operator includes power means, motor means energized by the power means, and means for coupling the motor means to the operator. Magnetic means are provided on the motor means and coupling means for braking the object when the motor means is de-energized.

The details of the present invention, both as to its construction and operation, can best be understood in reference to the accompanying drawings, in which like numerals refer to like parts, and which:

BRIEF DESCRIPTION OF THE DRAWINGS

FIG. 1 is a perspective view of a window covering actuator, shown in one intended environment, with portions of the head rail cut away;

FIG. 2 is an exploded perspective view of a non-limiting exemplary motor and gearbox, showing the braking magnets, with portions cut away;

FIG. 3 is a plan view showing the orientations of the braking magnets when the motor is de-energized;

DETAILED DESCRIPTION OF THE PREFERRED EMBODIMENT

Figure 4:
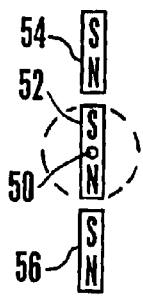
FIG. 4 is a schematic diagram of an alternate brake arrangement having two permanent magnets attached to the actuator housing, and a rotating magnet attached to the motor shaft, having one position of attraction and one position of repulsion, either of which will impede the rotation of the motor when the magnets are in close proximity to each other.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals.

FIG. 1 also shows that a small, lightweight electric motor 32 is coupled to a gear enclosure 34, preferably by bolting the motor 32 to the gear enclosure 34. The gear enclosure 34 is keyed to the rod 12, so that as the gears in the gear enclosure 34 turn, the rod 12 rotates.

It is to be understood that the motor 32 is electrically connected to the circuit board 30. To power the motor 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor 32 is closed to energize the motor 32 and move the window covering open or closed in accordance with the signal generated by the signal generator 28, under control of the processor on the electronic circuit board 30.

Now referring to a non-limiting illustrative embodiment in FIG. 2, the motor 32 can be a dc motor that has a metal or plastic housing 36 containing a rotor 38, a portion of which extends beyond the housing 36 and is configured as a gear. DC motor components known in the art, e.g., an armature and one or more field magnets 40 (permanent magnets and/or electro-magnets to establish the requisite magnetic field), are contained within the housing 36. If desired, the motor 32 can be an ac motor and the circuit board 30 can contain appropriate power conversion circuitry.

As shown in FIG. 2, on the portion of the rotor 38 that protrudes beyond the housing 36, at least one braking magnet 42 (two shown) is affixed by, e.g., solvent bonding or welding or brazing or soldering, or by any other means incorporating it into the rotor. The braking magnet 42 can be a small permanent magnet. Less desirably, the magnets of the present invention can be electromagnets, but that would require the addition of slip rings and brushes, and is thus not as desirable as using permanent magnets.

Turning to the gear enclosure 34, a housing 44 of the gear enclosure 34 can support gears in accordance with the principles set forth in the above-referenced U.S. Patent. Also, the housing 44 is formed with a receptacle 46, and the gear-shaped portion of the rotor 38 is received within the receptacle 46. The receptacle 46 includes structure for coupling with the rotor 38.

At least one and preferably two braking magnets 48 are affixed to the housing 44 of the gear enclosure 34 within the receptacle 46 by, e.g., solvent bonding or welding or brazing or soldering, or by any other means of incorporating them into the enclosure or fixed member of the actuator 10. The braking magnets 48 can be small permanent magnets or other magnetic elements. The braking magnets are affixed opposite each other relative to the enclosure 34.

With this combination of structure, when the motor 32 is de-energized, the braking magnet 42 of the motor 32 are attracted to the braking magnets 48 of the gear enclosure 34 in at least one position of rotation of the rotor. In this state, the braking magnets 42 of the motor 32 directly face and are closely spaced from the respective braking magnets 48 of the gear enclosure 34 as shown in FIG. 3, resulting in a magnetic coupling. These magnetic couplings brake the rod 12 from turning under the weight of the window covering 14 when the motor 32 is de-energized. The reduction in efficiency caused by the braking magnets 42, 48 when the motor 38 is activated is negligible because the magnetic elements aid the motor during a portion of the rotation of the rotor, and equally oppose the motor for an equal portion of the rotation of the rotor.

While the preferred embodiment disclosed above has a braking magnet on the extension of the rotor 38 that protrudes from the motor housing, the present braking magnet can be affixed to other components of powered drive trains that can encompass motors, actuators, and intervening components such as gears. Such other components can include, e.g., satellite gear carrier plates (in planetary gear systems), worm drives, metal/magnetic axles, drive rods, and other rotating components that are closely juxtaposed with stationary structure on which complementary braking magnets analogous to the magnetic elements 48 of the gear enclosure 34 can be mounted.

FIGS. 4–17 schematically show various braking arrangements that can be implemented in accordance with present principles, showing motor rotors that can be similar or identical to the rotor 38 shown in FIGS. 2 and 3, labelling north and south poles of permanent magnets "N" and "S", and indicating the plane of rotation of the rotor in dashed circular lines. It is to be understood that the non-moving magnets or magnetic elements disclosed below can be attached to, e.g., the motor housing 44 mentioned above.

Commencing with FIG. 4, a motor rotor 50 has a permanent magnet 52 attached to it. Two permanent non-moving magnets 54, 56 are provided. It will readily be appreciated that owing to the orientation of the poles of the magnets 52, 54, 56, the arrangement shown in FIG. 4 has one position of attraction and one position of repulsion, either of which will impede the rotation of the motor when the magnets are in close proximity to each other.

Figure 5:
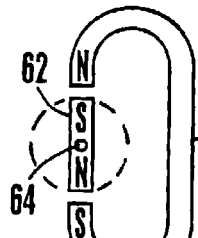
FIG. 5 is a schematic diagram of an alternate brake arrangement having one permanent magnet attached to the actuator housing, and a rotating magnet attached to the motor shaft, having one position of attraction and one position of repulsion, either of which will impede the rotation of the motor when the magnets are in close proximity to each other.

FIG. 5 is a schematic diagram of an alternate brake arrangement having one permanent non-moving generally racetrack-shaped magnet 60 that can be attached to, e.g., a motor housing, and a rotating permanent magnet 62 attached to a motor rotor 64 between the open ends of the fixed magnet 60. The open ends of the fixed magnet 60 define its magnetic poles as shown. The arrangement shown in FIG. 5 has one position of attraction and one position of repulsion, either of which will impede the rotation of the motor when the magnets are in close proximity to each other.

Figure 6:
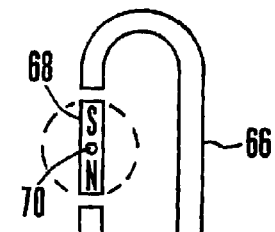
FIG. 6 is a schematic diagram of an alternate brake arrangement having one magnetic element that is not a magnet, attached to the actuator housing, and a rotating magnet attached to the motor shaft, having two positions of attraction that will impede the rotation of the motor when the magnet and the magnetic element are in close proximity to each other.

FIG. 6 is a schematic diagram of an alternate brake arrangement having a non-moving race-track shaped magnetic element 66 that is not a permanent magnet, but rather is made of a ferromagnetic material such as ferrite, soft steel, silica, or other ferromagnetic material. A rotating magnet 68 is attached to a motor rotor 70, with the arrangement of FIG. 6 having two positions of attraction that will impede the rotation of the motor when the rotating magnet 68 and the stationary magnetic element 66 are in close proximity to each other.

Figure 7:
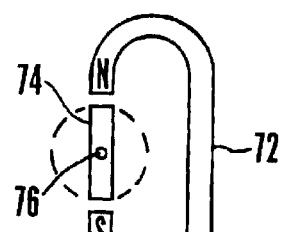
FIG. 7 is a schematic diagram of an alternate brake arrangement having one magnet attached to the actuator housing, and a rotating magnetic element that is not a permanent magnet attached to the motor shaft, having two positions of attraction that will impede the rotation of the motor when the magnet and the magnetic element are in close proximity to each other.

FIG. 7 is a schematic diagram of an alternate brake arrangement having one stationary generally racetrack-shaped permanent magnet 72 whose open ends define its magnetic poles. A rotating ferromagnetic element that is not a permanent magnet is attached to a motor rotor 76 between the open ends of the stationary permanent magnet 72, with this arrangement having two positions of attraction that will impede the rotation of the motor when the magnet 72 and the magnetic element 74 are in close proximity to each other.

Figure 8:
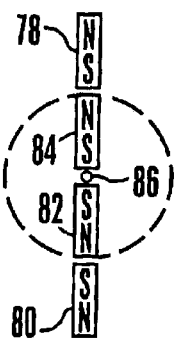
FIG. 8 is a schematic diagram of the arrangement shown in FIG. 3, having two permanent magnets attached to the actuator housing, and two rotating magnets attached to the motor shaft, having two positions of attraction that will impede the rotation of the motor when the magnets are in close proximity to each other.

FIG. 8 is essentially a schematic diagram of the arrangement shown in FIG. 3, having two permanent stationary magnets 78, 80 and two permanent rotating magnets 82, 84 attached to a motor rotor 86 between the stationary magnets 78, 80. This arrangement has two positions of attraction that will impede the rotation of the motor when the magnets are in close proximity to each other, because when the rotating magnets 82, 84 are aligned with the stationary magnets 78, 80 as shown, the polarities of adjacent rotating/stationary poles are opposite each other.

Figure 9:
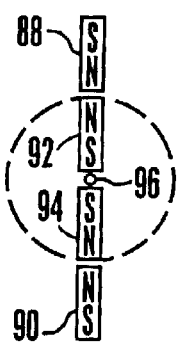
FIG. 9 is a schematic diagram of an alternate brake arrangement having two permanent magnets attached to the actuator housing, and two rotating magnets attached to the motor shaft, having two positions of repulsion that will impede the rotation of the motor when the magnets are in close proximity to each other.

FIG. 9 shows an arrangement similar to FIG. 8, in that two permanent stationary magnets 88, 90 and two permanent rotating magnets 92, 94 that are attached to a motor rotor 96 between the stationary magnets 88, 90 are provided. This arrangement, however, has two positions of repulsion that will impede the rotation of the motor when the magnets are in close proximity to each other, because when the rotating magnets 92, 94 are aligned with the stationary magnets 88, 90 as shown, the polarities of adjacent rotating/stationary poles are the same as each other.

Figure 10:
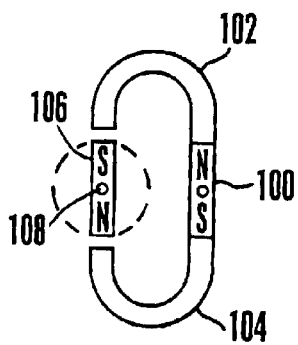
FIG. 10 is a schematic diagram of an alternate brake arrangement having one permanent magnet and two magnetic elements that are not permanent magnets attached to the actuator housing, and a rotating magnet attached to the motor shaft, having one position of attraction and one position of repulsion, either of which will impede the rotation of the motor when the magnets are in close proximity to each other.

FIG. 10 is a schematic diagram of an alternate brake arrangement having one permanent stationary magnet 100 that is contiguous to two magnetic elements 102, 104 to form a racetrack-shaped member with opposed open ends. A rotating magnet 106 is attached to a motor rotor 108, with this arrangement having one position of attraction and one position of repulsion, either of which will impede the rotation of the motor when the magnets are in close proximity to each other.

Figure 11:
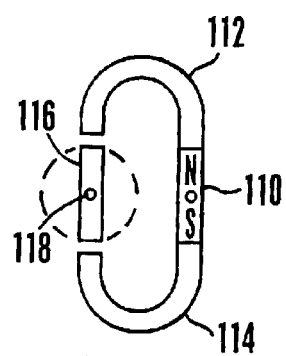
FIG. 11 is a schematic diagram of an alternate brake arrangement having one magnet and two magnetic elements that are not permanent magnets attached to the actuator housing, and a rotating one magnetic element that is not a magnet attached to the motor shaft, having two positions of attraction that will impede the rotation of the motor when the magnet and the magnetic element are in close proximity to each other.

FIG. 11 is a schematic diagram of an alternate brake arrangement having one permanent stationary magnet 110 that is contiguous to two magnetic elements 112, 114 to form a racetrack-shaped member with opposed open ends. A rotating magnetic element 116 that is not a permanent magnet is attached to a motor rotor 118, with this arrangement having two positions of attraction that will impede the rotation of the motor when the magnet-containing stationary member and the rotating magnetic element 116 are in close proximity to each other.

Figure 12:
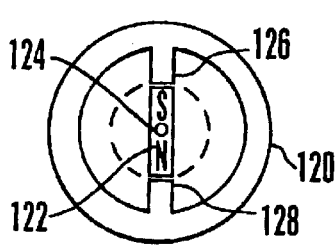
FIG. 12 is a schematic diagram of an alternate brake arrangement having one circular magnetic element that is not a magnet, attached to the actuator housing, and a rotating magnet attached to the motor shaft, having two positions of attraction that will impede the rotation of the motor when the magnet and the magnetic element are in close proximity to each other.

FIG. 12 is a schematic diagram of an alternate brake arrangement having one circular magnetic element 120 that is not a permanent magnet. A rotating permanent magnet 122 is attached to a motor rotor 124 between opposed radially-oriented lands 126, 128 of the stationary element 120. This arrangement has two positions of attraction that will impede the rotation of the motor when the magnet 122 and the magnetic element 120 are in close proximity to each other.

Figure 13:
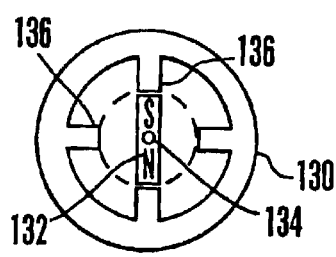
FIG. 13 is a schematic diagram of an alternate brake arrangement having one circular magnetic element that is not a magnet, attached to the actuator housing, and a rotating magnet attached to the motor shaft, having four positions of attraction that will impede the rotation of the motor when the magnet and the magnetic element are in close proximity to each other.

FIG. 13 is a schematic diagram of an alternate brake arrangement having one circular magnetic element 130 that is not a magnet and a rotating permanent magnet 132 attached to a motor rotor 134 between four radially-oriented equally spaced lands 136. This arrangement has four positions of attraction that will impede the rotation of the motor when the magnet and the magnetic element are in close proximity to each other.

Figure 14:
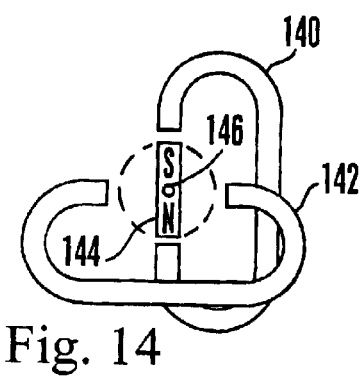
FIG. 14 is a schematic diagram of an alternate brake arrangement having two magnetic elements that are not a magnets, attached to the actuator housing, and a rotating magnet attached to the motor shaft, having four positions of attraction that will impede the rotation of the motor when the magnet and the magnetic element are in close proximity to each other.

FIG. 14 is a schematic diagram of an alternate brake arrangement having two stationary magnetic elements 140, 142 that are not a magnets. The stationary elements 140, 142 are generally racetrack-shaped and have open ends. The stationary elements 140, 142 are disposed substantially orthogonal to each other as shown with the combined four open ends of the magnets 140, 142 being spaced 90° from each other. A rotating magnet 144 is attached to a motor rotor 146 between the open ends of the elements 140, 142, with this arrangement having four positions of attraction that will impede the rotation of the motor when the magnet and the magnetic element are in close proximity to each other.

Figure 15:
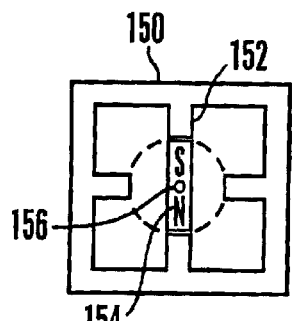
FIG. 15 is a schematic diagram of an alternate brake arrangement having one square magnetic element that is not a magnet, attached to the actuator housing, and a rotating magnet attached to the motor shaft, having four positions of attraction that will impede the rotation of the motor when the magnet and the magnetic element are in close proximity to each other.

FIG. 15 is a schematic diagram of an alternate brake arrangement having one stationary square magnetic element 150 that is not a magnet. Extending inwardly from the center of each side of the element 150 and perpendicular thereto is a respective land 152. A rotating magnet 154 is disposed between the lands 152 and is attached to a motor rotor 156, with this arrangement having four positions of attraction that will impede the rotation of the motor when the magnet and the magnetic element are in close proximity to each other.

Figure 16:
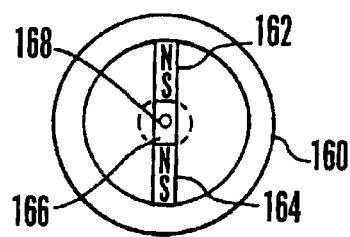
FIG. 16 is a schematic diagram of an alternate brake arrangement having one circular magnetic element that is not a magnet, attached to the actuator housing, including two permanent magnets, and a rotating magnetic element that is not a magnet attached to the motor shaft, having two positions of attraction that will impede the rotation of the motor when the magnets and the magnetic element are in close proximity to each other.

FIG. 16 is a schematic diagram of an alternate brake arrangement having one stationary circular magnetic element 160 that is not a magnet. Two radially-oriented permanent magnets 162, 164 extend inwardly from the element 160 and are diametrically opposed to each other. A rotating magnetic element 166 that is not a magnet is attached to a motor rotor 168, with this arrangement having two positions of attraction that will impede the rotation of the motor when the magnets and the magnetic element are in close proximity to each other.

Figure 17:
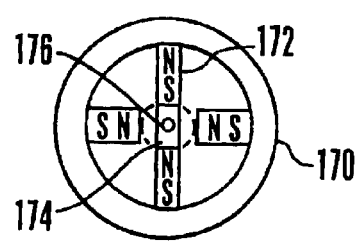
FIG. 17 is a schematic diagram of an alternate brake arrangement having one circular magnetic element that is not a magnet, attached to the actuator housing, including four permanent magnets, and a rotating magnetic element that is not a magnet attached to the motor shaft, having four positions of attraction that will impede the rotation of the motor when the magnets and the magnetic element are in close proximity to each other.

FIG. 17 is a schematic diagram of an alternate brake arrangement having one stationary circular magnetic element 170 that is not a magnet. Four radially-oriented permanent magnets 172 extend inwardly from the element 170 and are equidistantly spaced from each other. A rotating magnetic element 174 that is not a magnet is attached to a motor rotor 176, with this arrangement having four positions of attraction that will impede the rotation of the motor when the magnets and the magnetic element are in close proximity to each other.

While the particular BRAKING SYSTEM FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A powered assembly, comprising:
   at least one object that can be moved between a raised configuration and a lowered configuration;
   at least one motor;
   at least one actuator coupled to the motor and the object to move the object when the motor is energized, the motor and motor defining a rotating member;
   at least one magnet affixed to the rotating member; and
   at least one of: a permanent magnet, and a magnetic element that is not a permanent magnet, juxtaposed with the permanent magnet.

2. The powered assembly of claim 1, wherein the motor is powered by at least one dc battery.

3. The powered assembly of claim 2, wherein the object is a window covering.

4. The powered assembly of claim 1, wherein the rotating member is at least a portion of a rotor of the motor.

5. The powered assembly of claim 1, wherein at least two permanent magnets are attached to the rotating member.

6. The powered assembly of claim 1, wherein a magnetic element that is not a permanent magnet is stationarily juxtaposed with the rotating member.

7. The powered assembly of claim 1, wherein a permanent magnet is stationarily juxtaposed with the rotating member.

8. The powered assembly of claim 1, wherein the at least one of: the permanent magnet, and the magnetic element that is not a permanent magnet that is juxtaposed with the permanent magnet, defines a racetrack shape.

9. The powered assembly of claim 1, wherein the at least one of: the permanent magnet, and the magnetic element that is not a permanent magnet that is juxtaposed with the permanent magnet, defies a circular shape.

10. The powered assembly of claim 1, wherein the at least one of: the permanent magnet, and the magnetic element that is not a permanent magnet that is juxtaposed with the permanent magnet, defines a square shape.

11. The powered assembly of claim 1, comprising at least two permanent stationary magnets.

12. The powered assembly of claim 11, comprising at least four permanent stationary magnets.

13. The powered assembly of claim 1, wherein at least one magnetic element that is not a permanent magnet is attached to the rotating member, and at least one permanent magnet is stationarily juxtaposed therewith.

14. A drive assembly for a movable object including a rod, comprising:
   an electrically-powered drive structure couplable to the rod to move the object when the driv structure is energized to move at least one rotatable component of the drive structure;
   at least a first braking magnet attached to one of: a rotating component of the drive structure, and a stationary component of the drive structure; and
   at least one of: a second braking magnet, and a magnetic clement that is not a permanent magnet, attached to the other of: the stationary component, and the rotatable component such that the weight of the object is substantially impeded from moving the rod when the drive structure is de-energized only by a magnetic coupling without the need for any frictional brake.

15. The drive assembly of claim 14, wherein the drive structure is powered by at least one dc battery.

16. The drive assembly of claim 15, wherein the object is a window covering.

17. The drive assembly of claim 14, wherein the rotating component is at least a portion of a rotor of the motor.

18. The drive assembly of claim 14, wherein at least one permanent magnet is attached to the rotating component.

19. The drive assembly of claim 18, wherein at least two permanent magnets are attached to the rotating component.

20. The drive assembly of claim 18, wherein a magnetic element that is not a permanent magnet is stationarily juxtaposed with the rotating component.

21. The drive assembly of claim 18, wherein a permanent magnet is stationary juxtaposed with the rotating component.

22. The drive assembly of claim 14, wherein the at least one of: second braking magnet, and a magnetic element that is not a permanent magnet, attached to the other of: the stationary component, and the rotatable component defines a racetrack shape, or a circular shape, or a square shape.

23. The drive assembly of claim 14, wherein at least one magnetic element that is not a permanent magnet is attached to the rotating component, and at least one permanent magnet is stationarily juxtaposed therewith.

24. A power assembly for an object having at least one operator, comprising:
   power means;
   motor means energized by the power means;
   means for coupling the motor means to the operator: and
   magnetic means on the motor means and coupling means for braking the object when the motor means is de-energized, the magnetic means being the only braking structure for the motor.

25. The assembly of claim 24, wherein the object is a window covering, the motor means is at least one motor, the coupling means includes at least one gear housed in a gear enclosure, and the magnetic means includes at least one permanent magnet rotationally or stationarily disposed in the assembly.

26. The assembly of claim 25, wherein the power means is at least one dc battery.

* * * * *